United States Patent [19]

Morgan et al.

[11] Patent Number: 4,586,387
[45] Date of Patent: May 6, 1986

[54] FLIGHT TEST AID

[75] Inventors: Garth A. Morgan, Willaston; William I. Menadue, Joslin; Robert E. Clarke, Hectorville, all of Australia

[73] Assignee: The Commonwealth of Australia, Australia

[21] Appl. No.: 589,091

[22] PCT Filed: Jun. 8, 1983

[86] PCT No.: PCT/AU83/00078
§ 371 Date: Feb. 15, 1984
§ 102(e) Date: Feb. 15, 1984

[87] PCT Pub. No.: WO84/00064
PCT Pub. Date: Jan. 5, 1984

[30] Foreign Application Priority Data
Jun. 16, 1982 [AU] Australia .............. PF4452

[51] Int. Cl.[4] .............................................. G01L 5/22
[52] U.S. Cl. .................... 73/862.05; 2/160; 73/862.58
[58] Field of Search .............. 73/379, 862.05, 862.58; 2/160; 128/774

[56] References Cited
U.S. PATENT DOCUMENTS

| | | |
|---|---|---|
| 2,359,686 | 10/1944 | Stanley . |
| 2,383,554 | 8/1945 | Kriskler . |
| 3,447,766 | 6/1969 | Palfreyman . |
| 3,532,344 | 10/1970 | Masstab ................................ 2/160 |
| 3,620,075 | 11/1971 | Edwards . |
| 3,670,574 | 6/1972 | Edwards . |
| 3,832,895 | 9/1974 | Strandh . |
| 3,924,458 | 12/1975 | Woodworth et al. . |
| 4,046,005 | 9/1977 | Goroski . |
| 4,144,877 | 3/1979 | Frei et al. ........................ 128/774 |
| 4,337,780 | 7/1982 | Metrick ........................... 73/379 X |

Primary Examiner—Charles A. Ruehl
Attorney, Agent, or Firm—Cushman, Darby & Cushman

[57] ABSTRACT

A flight test aid comprising means to measure force that is applied by a pilot to the controls (7) of an aircraft to adjust the control surfaces while manoeuvering the aircraft which utilizes a plurality of sensors (5-6) supported in the interface between the control member (7) and the part of the pilot (1) operating the control and means (9) to record the force from the sensors (5-6) preferably through differencingmeans (21) to cancel pressure applied equally to the sensors (5-6). A typical example is a glove (1) with finger and palm sensors (5-6) connected to indicator means (9) preferably through a differencer (21).

11 Claims, 7 Drawing Figures

FLIGHT TEST AID

This invention relates to a flight test aid and in particular it relates to a unit that is arranged to measure the force that is applied by a pilot to the control column of an aircraft in order to adjust the ailerons and elevators whilst manoeuvering the aircraft in flight.

It is necessary when flight testing an aircraft to know how much force must be applied to the control column in order to perform various manoeuvers.

The object of the present invention is to provide a simple and effective device that, rather than requiring special preparation of the aircraft to be tested by fitting load measuring equipment to the control column, is an independent unit that may be carried by the pilot and thus be applicable to any aircraft that it is necessary to test.

The invention uses at least two force sensors that are fitted to a glove or some similar article that may be worn on the hand of the pilot in the case of a control column, the sensor being fitted across the palm and heel of the thumb, hereinafter referred to as a palm force sensor, and across the fingers, hereinafter referred to as a finger force sensor and being positioned so that they are interfaced between the hand and the column where they sense the forces exerted by the hand on the column, the palm force sensor sensing force used when pushing the column, and the finger force sensor sensing the force used when pulling the column.

By turning the hand to position the sensors on the lateral surfaces of the control column it is possible to measure the forces required to roll the aircraft to either the right or the left.

In its preferred form the sensors contain flexible sacs filled with a fluid such as silicone oil that are connected by small flexible tubes to pressure transducers, these in turn being connected to electronic circuits that convert the signals from the transducers into a form suitable for visual display by digital or other means or for connection to a recording device.

The two sensors are generally of different dimensions because of the limitations imposed by their positions, the finger force sensor preferably spans two fingers only as the first and fourth fingers generally should be left free to operate switches on the control column. It is therefore necessary that the electronic circuits can adjust the signal from each of the transducers to give the required force reading. It is also necessary to remove any component of the reading brought about by the pilot's hand gripping the control column.

These objectives are achieved by adjusting the magnitude of the output signal from each transducer, by opposing them in sign thus creating a difference that cancels out the grip component of the signals allowing the force components to be identified and displayed. The signals may also be fed into other electronic data gathering and processing equipment to provide repeat displays, information on the maximum forces used during a manoeuver, or permanent record of the forces exerted during the course of the tests.

The display unit may be mounted on the glove itself or, by use of appropriate electrical connections, on the pilot's knee pad or some convenient part of the cockpit structure to make it easier for the pilot to read the display during the flight.

Thus the invention relates to a flight test aid comprising means to measure force that is applied by a pilot to the control column of an aircraft to adjust the aileron and elevators or other control surfaces while manoeuvering the aircraft in flight, having a first force sensor, a second force sensor, display means to indicate force in the sensors, and means to locate the sensors between the hand of a pilot and the control column, the means being arranged to locate the sensors on substantially opposite sides of the control column when the pilot grasps the control column.

According to a variation the sensors may be applied to the rudder pedals.

In order that the invention may be more fully understood an embodiment thereof will now be described with reference to the accompanying drawings in which:

FIG. 7 is a block diagram showing the system in general.

The glove 1 can be constructed in any usual manner and includes fingers 2, a thumb 3, and a palm 4 and may be the standard glove used by pilots engaged in test or normal flights or maybe attached to the hand in some other manner.

Figures 1, 2, 3:
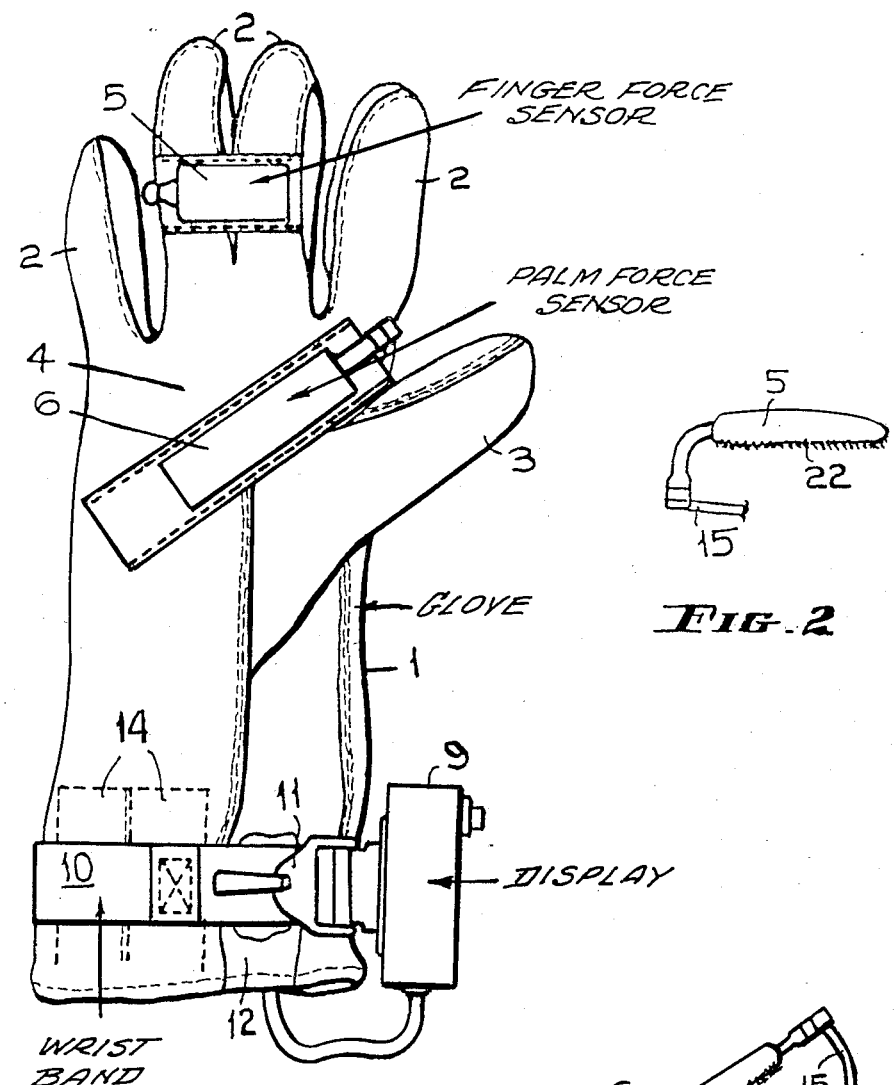
FIG. 1 is a view of a glove embodying the invention taken from the palm side indicating the general position of the force sensors.
FIG. 2 is a schematic side elevation of the finger force sensor.
FIG. 3 is a schematic side elevation of the palm force sensor.

Secured to the two middle fingers of the glove, see FIG. 1, is the one pressure sensor 5 which is fixed to the glove.

Positioned across the plam 4 and the heel of the thumb 3 is the second pressure sensor 6 which again can be attached to the glove.

Figure 6:
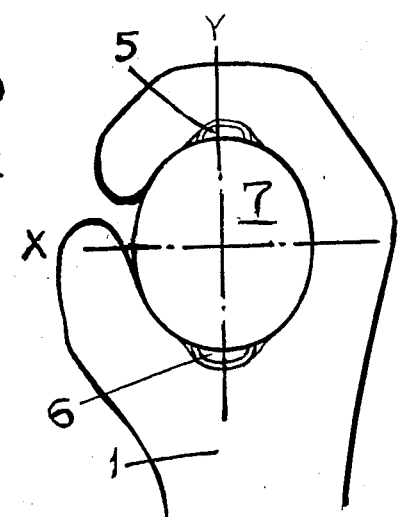
FIG. 6 is a schematic view of a control column showing the position of the pressure sensors in relation to the fore and aft axis of the control column movement.
Figure 2:
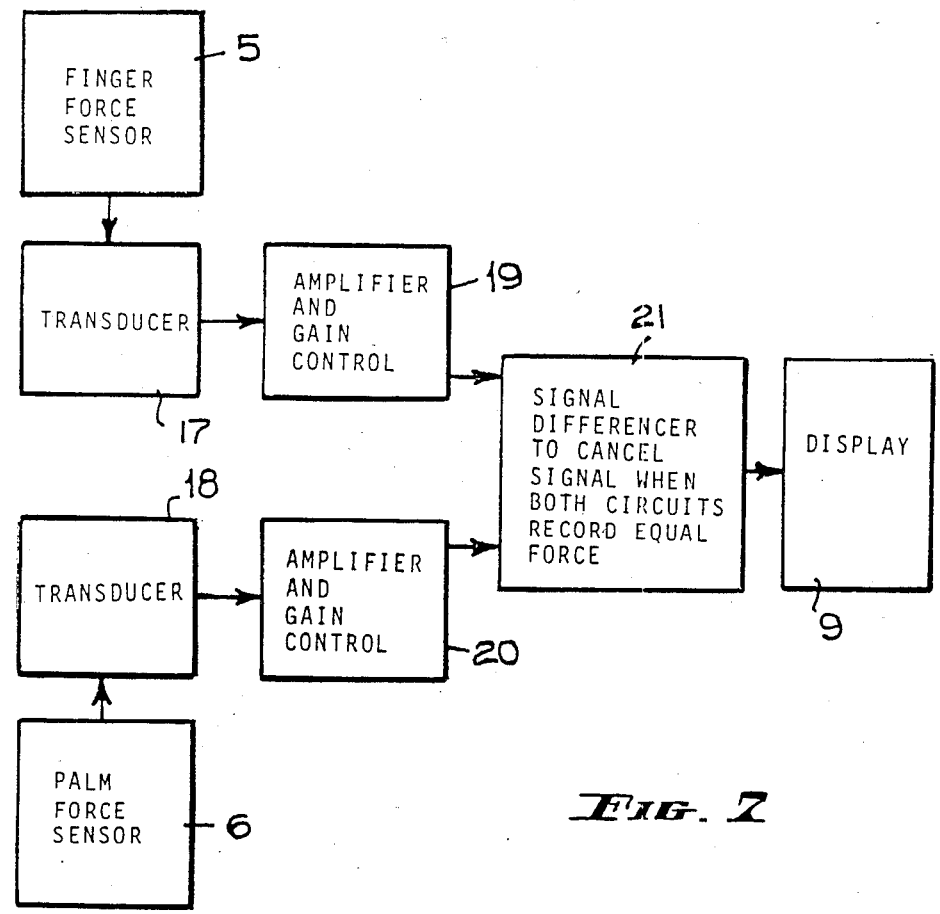

This sensor 6 being inclined across the glove 1 with the two pressure sensors 5 and 6 so spaced apart on the glove 1 that when the pilot grasps the stick or other control member, the sensors 5 and 6 are on opposite sides of the stick as shown diagrammatically in FIG. 6 where 7 represents the control column, the position of the glove being such that the sensors 5 and 6 act about the X axis, that is the transverse axis about which elevator control acts. If the glove 1 is rotated through 90 degrees the sensing will be about the Y axis which is the roll axis.

The display unit for indicating forces generated by the finger force sensor 5 and the palm force sensor 6 is designated 9 and may by any convenient type, and this is carried by a strap 10 having buckle means 11 whereby it can be mounted on the wrist portion 12 of the glove. Alternatively it could be permanently fixed thereto if that is required depending on whether the force indicator unit 9 is to be read while on the wrist of the pilot or whether it is to be located at some remote position such as on the knee pad of the pilot or on some part of the aircraft itself.

The power supply for the device in the case of electrical operation is obtained from batteries carried in pouches 14 on the glove 1 but again power can be from an external source.

Figure 4:
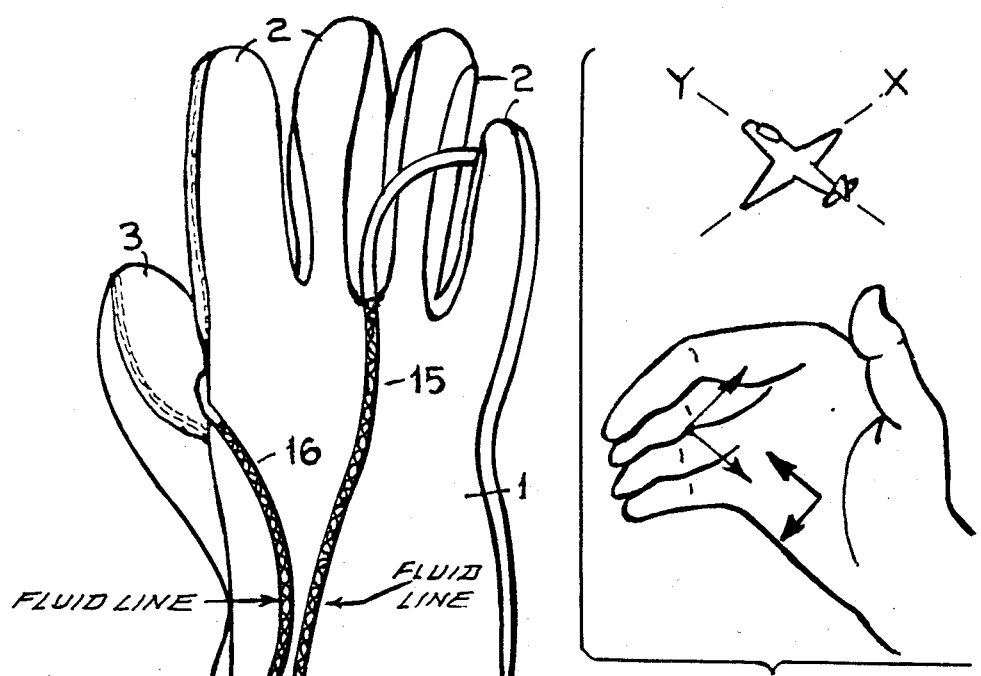
FIG. 4 is a view from the back of the glove showing the leads from the force sensors to the indicator.

The finger force sensor 5 and the palm force sensor 6 shown in the illustration are of the liquid type and each sensor has in it a liquid such as a silicone which is transmitted by pressure lines 15 and 16 to transducer 17 and 18 carried on the wrist strap 10, see FIG. 4, and these lines 15 and 16 can be made detachable depending on where the force indicator display 9 is located.

According to the form illustrated, pressure fluid displaced in the finger force sensor 5 is carried by the line 15 to the transducer 17 while pressure fluid displaced by the palm force sensor 6 is carried through the line 16 to the transducer 18 in which the readings from the two lines are translated to electrical units and processed so that when both lines 15 and 16 have the same pressure, a zero reading is obtained on the force indicator display unit 9, this indicating that the pilot has a firm grasp of the stick, but the arrangement ensuring that this pressure on the control column 7 does not record a directional pressure reading, the force readings being recorded only when force is exerted to move the control column, or the control column has forces on it which press it against either one or the other sensor.

In use the device can readily be so arranged that a forward push on the control column 7, or stick as it is sometimes called, will record only on the palm force sensor 6 whereas a rearward pull on the control column will record only on the finger force sensor 5.

The above assumes that the hand is positioned on the control column 7 to move the column about the X axis but if a reading about the Y axis is required, that is for roll of the aircraft, the hand is turned through about 90 degrees.

Figure 5:
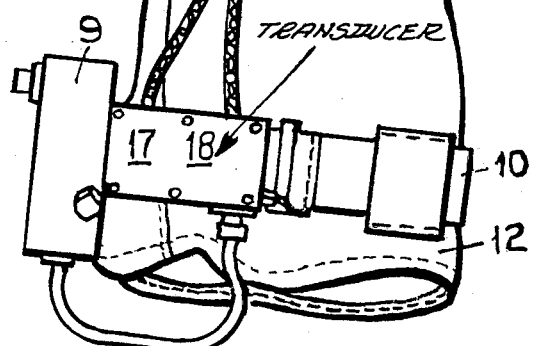
FIG. 5 is a schematic view showing the two planes X and Y about which an aircraft requires to be tested and showing within the hand the general direction of the four forces involved.

As will be apparent from FIG. 5, the gloved hand can be positioned on the control column 7 to measure forces in any required direction and while it is preferred to balance the forces to remove readings which are purely the result of pressure of the hand on the control column, compound readings are possible.

The block diagram of FIG. 6 shows the general arrangement of the device, the finger force sensor 5 and the palm force sensor 6 are each connected to a transducer, designated 17 and 18, which connect through amplifier and gain control units 19 and 20 which in turn pass the two signals to the signal differencer 21 to subtract the signals from each transducer if such exist to give a force signal on the force indicator display 9.

The signal differencer 21 cancels the signals from the transducers 17 and 18 when both of the circuits record equal force, such as when the pilot firmly grasps the control column 7, and the output of the signal differencer 21 is fed to the force indicator display unit 7 so that if force exists only on the finger force sensor 5 the display will record that force only, and similarly if force is applied only on the palm force sensor 6, that force will be displayed, but if during this the pilot is exerting a resultant force on the control column 7 only the resultant force will be shown on the display unit 21.

As said however it is not necessary to read the force recorded by both of these sensors 5 and 6 as the pilot can for instance when pushing the control column, or when the control column pushes against his hand, record the one force only without the need to determine the resultant force. In this way it is possible to operate the device without the signal differencer being included in the circuitry, and it would in fact be possible to display the output of the amplifier 18 of the finger and palm force sensors 5 and 6 independently on a display unit if that were desirable.

It will be realised that the device gives the pilot a valuable aid in determining force required to operate a stick or similar control member on an aircraft and it is to be clear also that while in the illustrations a fluid medium has been used in the sensors, other forms of force or pressure sensor can be used which could be housed in the two sensors and which would give direct reading on for instance a digital display or other form of indicator and the electrical readings from the sensors can still be processed in a signal differencer.

Each amplifier and gain control 19 and 20 could connect directly to a dual display 9 if differencing was not required.

The further output from the device can be connected to processing, recording or display devices.

To ensure that there is adequate bearing area between the sensors and the hand grip when actuating the control column in both longitudinal and transverse directions, and that the sensors are oriented normal to the directions while the pilots hand resides in a naturally comfortable unstrained condition, and the pilot is able to actuate essential switches on the control column while his hand is orientated for the normal function, the finger and palm force sensors may be relocatable on self-adhering backing to allow alignment as required for a given pilot on a particular aircraft.

The self-adhering backing may be that known under the trade name "Velcro" designated by 22 in FIGS. 2 and 3.

When the sensors are arranged on the feet of a pilot, the two sensors have lines to the display, preferably through the signal differencer.

From the foregoing it will be realised that the invention is a device that is fitted to the hand that a pilot uses to operate the aircraft control column when flying an aircraft. This unit senses the forces generated by the pilot's hand on the control column, and provides, through suitable electronic circuits, the necessary signals to operate a visual display. The display unit may be mounted on the glove, or on any other convenient location that may be required. The invention enables the pilot, by positioning his hand in various ways, to determine the forces that must be applied to the control column of an aircraft in order to execute any manoeuver. Since the device is pilot orientated, it is possible to flight test any aircraft at short notice without prior instrumentation of the control column. The signals from the invention may be used to provide a variety of immediate displays, and may also be recorded and used for post test evaluation.

We claim:

1. A flight test aid comprising means to measure force that is applied by a pilot to the control column of an aircraft to adjust the ailerons and elevators while manoeuvering the aircraft in flight, and having a finger force sensor, a palm force sensor, display means to indicate force on the said sensors, and characterised by support means adapted to be positioned on the hand of a pilot to locate the said sensors between the hand of a pilot and the control column, the said means being arranged to locate the said sensors on substantially opposite sides of the said control column when the pilot grasps the control column, and including an electrical signal differencer connected between the said sensors and the said display means, and means in the said signal differencer to subtract signals proportional to the force generated in one of the said sensors from that generated in the other said sensor to cause the said display means to record only the resultant force.

2. A flight test aid according to claim 1 wherein said support means adapted to be supported on the hand of the pilot comprises a thumb with a heel, a palm and at least two middle fingers, characterised in that said finger force sensor is positioned on the two middle fingers of said support means and the said palm force sensor is positioned on the palm and heel of the thumb of said support means.

3. A flight test aid according to claim 2, including self-adhering sections on the support means, the said finger force sensor, and the said palm force sensor to allow selective positioning of the said sensors on the said support means.

4. A flight test aid according to claim 2, characterised in that the said finger force sensor and said palm force sensor each include a sensing fluid, a transducer arranged to change force units to electrical signals supported on a band, fluid lines between each said sensor and separate sections of said transducer, and amplifier and gain control means connected to receive the said electrical signals from the said transducer.

5. A flight test aid according to claim 1 characterised by self-adhering sections on the said support means and the said finger force sensor and the said palm force sensor to allow selective positioning of the said sensors on the said support means.

6. A flight test aid according to claim 5, characterised in that the said finger force sensor and said palm force sensor each include a sensor fluid, a transducer arranged to change force units to electrical signals supported on a band, fluid lines between each said sensor and separate sections of said transducer, and amplifier and gain control means connected to receive said electrical signals from the said transducer.

7. A flight test aid according to claim 1, characterised in that said finger force sensor and said palm force sensor each include a sensing fluid, a transducer arranged to change force units to electrical signals supported on a band, fluid lines between each said sensor and separate sections of said transducer, and amplifier and gain control means connected to receive the said electrical signals from the said transducer.

8. A flight test aid according to claim 7 in which the said display means are mounted on the said band.

9. A flight test aid according to claim 8 characterised by said band being mounted on a wrist part of said support means, said support means including a power source.

10. A flight test aid according to claim 7 in which the said display means are mounted remotely of the said band.

11. A flight test aid for measuring forces applied between the hand of a pilot and a control column characterised by
(a) a glove to fit the hand of a pilot and provide an interface between the said glove and the said control column,
(b) a finger force sensor attached across the inside of the middle fingers of the said glove at the said interface,
(c) a palm force sensor attached across the palm and the heel of the thumb of the said glove, at the said interface,
(d) means to transfer force measurements from each said sensor to gain control means,
(e) means to display the measurements of the said sensors from the said gain control means, and
(f) a signal differencer interposed between the said gain control means and the said display means arranged to cancel by subtraction the signal proportional to the force of the grip of the pilot on the said control column.

* * * * *